(12) United States Patent
Thompson et al.

(10) Patent No.: US 8,035,630 B2
(45) Date of Patent: Oct. 11, 2011

(54) USB IMAGE TRANSMISSION SYSTEM AND DEVICE

(75) Inventors: Kevin Thompson, Salem, OR (US); Ross Kruse, Salem, OR (US); Steve Stark, Portland, OR (US)

(73) Assignee: Seiko Epson Corporation, Tokyo (JP)

(*) Notice: Subject to any disclaimer, the term of this patent is extended or adjusted under 35 U.S.C. 154(b) by 1033 days.

(21) Appl. No.: 11/871,888

(22) Filed: Oct. 12, 2007

(65) Prior Publication Data

US 2008/0088634 A1 Apr. 17, 2008

Related U.S. Application Data

(60) Provisional application No. 60/851,588, filed on Oct. 13, 2006.

(51) Int. Cl.
*G06F 3/038* (2006.01)
*G09G 5/00* (2006.01)

(52) U.S. Cl. ............................. 345/204; 345/156

(58) Field of Classification Search ............. 345/204, 345/156, 520, 538; 710/313; 386/231
See application file for complete search history.

(56) References Cited

U.S. PATENT DOCUMENTS

| | | | |
|---|---|---|---|
| 6,346,933 B1 | 2/2002 | Lin | |
| 6,753,840 B2 | 6/2004 | Aoki | |
| 6,793,346 B2 | 9/2004 | Nakano et al. | |
| 6,829,392 B2 | 12/2004 | Aoki | |
| 6,829,664 B2 | 12/2004 | Nomizo et al. | |
| 6,877,091 B2 | 4/2005 | Nomizo et al. | |
| 6,880,938 B2 | 4/2005 | Nakano | |
| 6,937,370 B1 | 8/2005 | Nitta et al. | |
| 7,093,989 B2* | 8/2006 | Walmsley et al. | ........ 400/62 |
| 2001/0042117 A1 | 11/2001 | Yoshino et al. | |
| 2002/0005858 A1 | 1/2002 | Aoki | |
| 2002/0027603 A1 | 3/2002 | Kuwata et al. | |
| 2002/0030833 A1 | 3/2002 | Kuwata et al. | |
| 2002/0041263 A1 | 4/2002 | Aoki | |
| 2002/0044293 A1 | 4/2002 | Fukasawa | |
| 2002/0131078 A1 | 9/2002 | Tsukinokizawa | |
| 2003/0126326 A1 | 7/2003 | Nomizo et al. | |
| 2003/0164926 A1 | 9/2003 | Nakano et al. | |
| 2003/0174289 A1 | 9/2003 | Nakano | |
| 2004/0041775 A1 | 3/2004 | Irie | |
| 2004/0060011 A1 | 3/2004 | Nitta et al. | |
| 2004/0130502 A1 | 7/2004 | Sato et al. | |
| 2004/0207869 A1 | 10/2004 | Endo | |
| 2004/0227900 A1 | 11/2004 | Sato et al. | |
| 2005/0015523 A1 | 1/2005 | Ishida et al. | |
| 2005/0158065 A1 | 7/2005 | Matsuda | |
| 2005/0174600 A1 | 8/2005 | Kitahara et al. | |
| 2005/0190399 A1 | 9/2005 | Nakaoka et al. | |
| 2005/0243362 A1 | 11/2005 | Sakuda et al. | |
| 2005/0278455 A1 | 12/2005 | Ichieda | |
| 2006/0109502 A1 | 5/2006 | Nakajima et al. | |
| 2006/0126102 A1 | 6/2006 | Sakuda | |
| 2006/0129806 A1* | 6/2006 | Walmsley | ............ 713/161 |
| 2006/0181685 A1 | 8/2006 | Hasegawa | |
| 2006/0203133 A1 | 9/2006 | Fujiwara | |

* cited by examiner

*Primary Examiner* — Ricardo L Osorio
(74) *Attorney, Agent, or Firm* — Kilpatrick Townsend & Stockton LLP

(57) ABSTRACT

A USB image transmission system is provided. The USB image transmission system may include a content source configured to be operatively coupled to a USB-enabled display device. Image data may be transmitted over the USB connection from the content source for display by the display device. In some embodiments, a USB collaboration hub may enable multiple content sources to be operatively linked through a USB connection to one or more USB-enabled display devices.

16 Claims, 6 Drawing Sheets

USB IMAGE TRANSMISSION SYSTEM AND DEVICE

CROSS-REFERENCE TO RELATED APPLICATIONS

This application claims priority from U.S. Provisional Patent Application Ser. No. 60/851,588 of Kevin Thompson, Ross Kruse, and Steve Stark, for a USB IMAGE TRANSMISSION SYSTEM AND DEVICE, filed Oct. 13, 2006, the disclosure of which is hereby incorporated by reference in its entirety and for all purposes.

FIELD

The present application relates to systems, apparatus and methods for transmitting image data from a content source to an image display device.

BACKGROUND AND SUMMARY

Information display devices, also referred to herein as image devices or image display devices, may be used in a variety of environments. Example information display devices include, but are not limited to, televisions, monitors, and projectors. The following is a non-exhaustive list of exemplary image devices: cathode ray tubes (CRTs), flat panel liquid crystal display systems, LED systems, plasma systems, front projection systems, rear projection systems, LCD monitors, etc. Information display devices may be adapted to display images, including text, graphics, video images, still images, presentations, etc. Such image devices may be found in home environments and applications, education environments and applications, business facilities, conference rooms and other meeting facilities, etc.

Images or content displayed on the image devices may be provided by one or more of a plurality of different content sources. Example content sources include, but are not limited to, computers, storage mediums such as memory cards and other memory devices, cameras, telephones, portable data assistants, media players, etc. Image data from the content source may be transmitted to the display device directly or through a network. The content source may be connected, e.g. wired or wirelessly, to the image device for transmission of content to the image device, allowing the image device to display the content.

Content sources may be coupled to image devices using multiple types of connectors, connections and systems. For example, known systems utilize a variety of types of cable technology for transmitting graphic and image data. Examples include: VESA connectors, Component systems, Composite systems, S-Video systems, M1-DA systems, DVI systems and HDMI systems. The various systems can increase the cost of image displays and also can increase installation difficulty in application environments. The various systems may frustrate a user trying to connect a display device to a content source and therefore prevent enabling of the content for display. Further, image devices that use image source auto-detection may introduce delay as the image device identifies the image source mode through standard methods of image source auto-detection.

The inventors herein have recognized a different method for transmitting image data between a content source and an image device. As described in more detail below and as an example, a method, system and apparatus may utilize a USB image transmission system. An image display device may be adapted to receive image data through an enumerated USB connection. Using a well established connection standard, such as a USB connector, can reduce user frustration compared to current standard practices. Moreover, delay periods due to image-source detection may be eliminated using a USB image transmission system. A USB image transmission system may also reduce dependence on current analog detection circuitry in image devices, thus enabling the option of a digital-only image device. Further, the USB transmission system described herein may reduce manufacturing costs of display systems compared to current systems.

DETAILED DESCRIPTION

Figure 1:
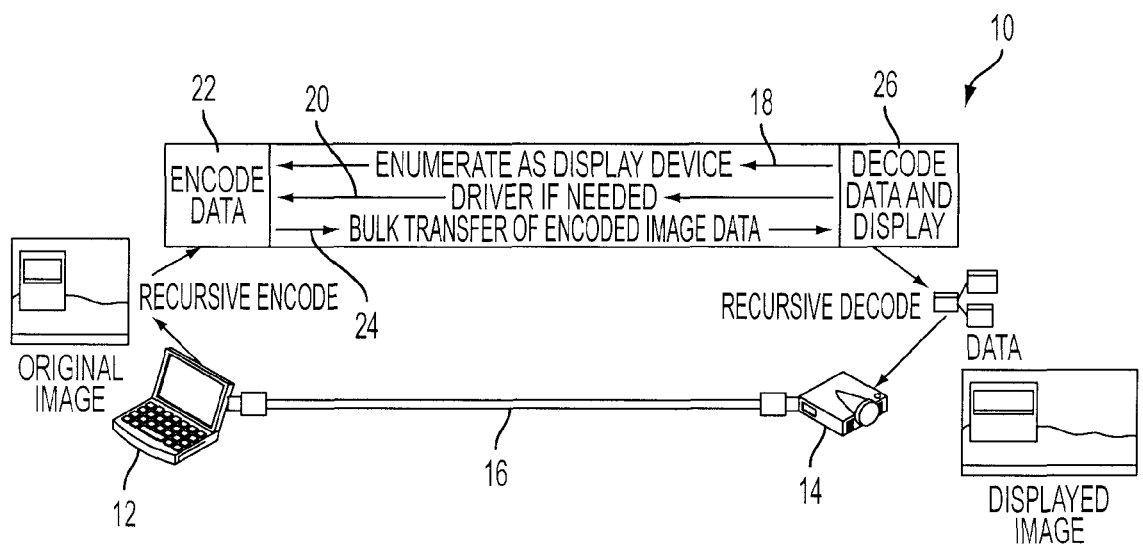
FIG. 1 shows a schematic depiction of an exemplary embodiment of a USB image transmission system between a content source (e.g. host computer) and a display device according to the present disclosure.

FIG. 1 illustrates generally an exemplary USB image transmission system 10. It should be appreciated that the following transmission system description and corresponding figures provide exemplary environments in which the system may be applied. The system may be adapted for use in other environments without departing from the scope of the present disclosure.

Example USB image transmission system 10 may include a content source 12 operatively coupled to a display device 14. Content source 12 may be any suitable computing or image storage device capable of generating image data. Examples of image data include computer graphics or other video-based image data. In one example, content source 12 may be a computer, a desktop computer, a laptop computer, a server, a storage medium such as a memory card and other memory devices, a camera, a telephone, a portable data assistant, a media player, etc. In some embodiments, a content source may include a combination of devices, such as a networked computer system, where the content source includes a computer linked through a network, such as a public network, e.g. the Internet, or a private network.

In some embodiments, content source 12 may be operatively coupled to display device 14 through a USB or equivalent connection. For example, content source 12 may be coupled to display device 14 though a wired USB connection, such as a standard USB 2.0 cable. In other embodiments, content source 12 may be wirelessly coupled to display device 14 through a wireless ultra-wideband USB connection, similar to the wireless USB connection depicted in FIG. 3. However, it should be appreciated that the term USB connection as used herein may refer to a wired or wireless connection. Additionally, although described in regards to a USB connection, in some embodiments, instead of a USB connection, a different high speed serial bus component may be used, such as but not limited to IEEE1394 (firewire).

As described above, display device 14 may be any suitable image display device. For example, display device 14 may be a large format display device (LFDD). LFDDs include, but are not limited to: CRTs, flat panel LCDs, plasma systems, LED systems, front projection systems and rear projection systems. It should be appreciated that although described in regards to transmission to an LFDD, the USB image transmission system may be used in a variety of environments, including transmission to small format display devices such as smart phones and personal digital assistants (PDAs).

Referring back to FIG. 1, upon connection of the USB link between content source 12 and display device 14, the display device 14 may initiate an end-point enumeration 18 wherein a unique device number is assigned to the display device 14, and a data structure containing information and properties about the display device 14 may be read. In some embodiments, the enumeration may include a display device descriptor, wherein the display device descriptor may include display device information including, but not limited to: manufacture information, model information, display mode information (resolution, gamut, color temperature, etc.), or other display device status information, etc. The content source 12 may receive the display device enumeration (including the display device descriptor) and acknowledge the display device enumeration.

Upon identification of the display device 14, the content source 12 may identify whether it has a driver and extended applications for the display device 14. If the content source 12 has no driver, for example, the content source may request a driver from the display device 14. The display device 14 may transmit the content source driver, held resident in the display device (e.g. USB display driver), as indicated at 20, to the content source 12. The content source 12 may then install the transmitted display driver 12 and extended applications, if needed. In some embodiments, the USB driver may be a standard USB driver enumerated for bulk and I-synchronous data transfers.

Following installation of the display driver, or identification of the display driver if driver already present on the content source 12, a bulk end-point for image data and a control end-point for control data are established by the content source 12. Image data may then be transmitted over the USB connection from the content source 12 to the display device 14.

The content source 12 may establish the link with the display device 14 using any suitable operating system, including, but not limited to, any one of the Microsoft Window systems, Apple operating systems, LINUX systems, UNIX systems, etc. For example, the content source 12 may implement the dedicated USB display driver through standard Windows monitor display control mechanisms. Although this disclosure describes a Microsoft Windows environment as an example, the principles of this disclosure are not so limited and any other suitable operating system may be used by the content source 12 without departing from the scope of the disclosure.

Generally, the image data is transmitted to the display device 14 in an encoded format. For example, the image data may be encoded by the content source 12 to a reduced content size. The encoded data 22 (including encoded image elements) may be transferred via the USB driver over the USB link, as indicated at 24.

The display device 14 may receive the encoded data through the enumerated USB end-point. The encoded data may be decoded and displayed as indicated at 26. For example, the image elements may be transferred to a dedicated display device computer architecture (e.g. silicon on chip ("SOC") or capable CPU based-system) which may decode the image elements to correspond to the original graphic orientation and representation. As such, the dedicated display device computer architecture may act as a graphic engine driving the intended output to the display device 14.

Referring back to FIG. 1, and as a use example, upon completion of the USB enumeration, a display device icon may appear in the content source display. In some embodiments, the display device icon may automatically load onto the user's content source. For example, if the display device 14 is a projector, a projector icon may automatically appear in the Windows Desktop tray, other Windows Control Panel, or otherwise in a graphical user interface (GUI).

In some embodiments, a user may select a transmission option or mode. For example, the user may select the display device icon and select a transmission mode. For example, a user may select between a Mirror Desktop Monitor mode and an Extended Desktop Monitor mode and a Local Monitor Only mode. If the user does not select one of the transmission options, the system may be preset with a default, such as a default to the Local Monitor Only mode. The Local Monitor Only mode may retain the content source at status quo—the USB display driver may be inactive.

In some embodiments, other modes may provide options for what images are transmitted and displayed by the display device 14. For example, in the Mirror Desktop Monitor mode, image content on the local display may be encoded and transferred to a display device. This transmission may create a substantial mirror image of what a user has displayed on a content source 12 monitor. Additionally, in an Extended Desktop Monitor mode the image content of the Extended Desktop may be encoded and transferred to a display device 14. In this example, the transmission may create a local desktop for personal viewing on the content source, and an extended desktop for collaborative viewing using the display device 14.

Thus, following USB enumeration and selection of the Mirror Desktop Monitor mode, a USB display driver may direct all graphic primitives to a local monitor and its own private image data memory space. In one embodiment, the local monitor drawing primitives may behave as normal and remain unchanged. Additionally, the private image data may be used to compare new image frames with old image frames to identify image deltas (Delta Image comparison). Image deltas may then be encoded into compressed image data. Depending on the system, example encoded image deltas include: color space correction, color space conversion, image scaling, wavelet compression, LZO compression, the image package specification and image data (image location, length of encoded image data, encoding process details, image data, etc.). In one embodiment, the encoded image deltas may be transmitted to the display device 14 over a bulk end-point enumeration.

In some embodiments, in a Extended Desktop Monitor mode, the private image data memory space may be updated with image data presented to the extended desktop only. Thus, local desktop image data may be retained on the content source 12 for personal viewing.

The display device 14 may receive the packaged image data and decode the encoded image data using package specification. It should be appreciated that any suitable encoding and decoding scheme may be used to package, transmit and/or regenerate the original image data. In some embodiments, recursive decoding may be used to decode the image data. For example, other encode/decode processes could also be used, e.g. JPEG200, H.264, RDP, MPEG2/4 (implemented on multi-core host computers), Divx, QuickTime, etc.

In some embodiments, the USB link may also include control functions. For example, user-selection inputs (e.g. mouse sprites) and display device controls (e.g. brightness, volume, etc.) may be sent through a control end-point as established by the content source 12. In this way, image data may be transferred over a bulk-end point and control data transferred through a control end-point.

As described above, the USB image transmission system provides an improved use-mode for a user, removing the need to connect using video only connectors (E.g. VESA connectors) as well as the process of enabling VESA-out from standard compute platforms such as laptops. The removal of the VESA connector may reduce manufacturing cost of the display device 14. For example, the use of USB connection may eliminate the more expensive VESA connector and may reduce the number of layers (e.g. the power/ground planes for VESA connectors) required for the printed circuit board to enable use of the VESA connector. In another example, the use of a USB connection can remove HW/SW functions dedicated to detecting Analog image sources such as VESA, Component, S-Video, and Composite signals. Further, the use of the USB image transmission system may substantially eliminate the delay period which occurred in prior/existing systems as the display device identified the proper source mode through standard methods of analog auto-detect. Further, the use of the USB connection enables content source manufacturers to eliminate the VESA-out option on the content source which may reduce manufacturing costs of the content source.

Figure 2:
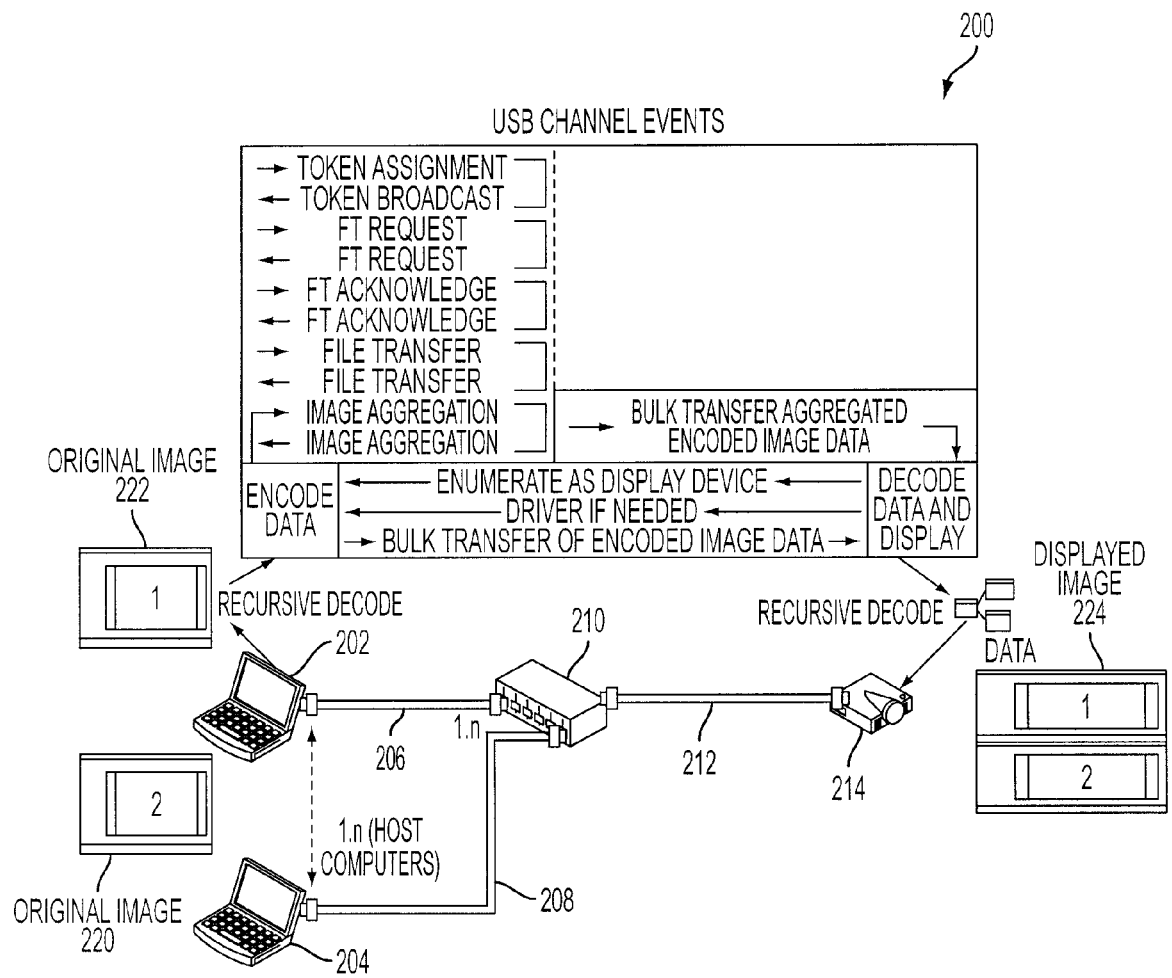
FIG. 2 shows a schematic depiction of another exemplary embodiment of a USB transmission system between a plurality of content sources and a display device utilizing a USB collaboration hub according to the present disclosure.

FIG. 2 shows a schematic depiction of another exemplary embodiment of a USB transmission system between a plurality of content sources 202 and 204 and a display device 214 as indicated generally at 200. In the present embodiment, a plurality of content sources, e.g. moderator computer 202 and host computer 204 are operatively linked through USB connections 206 and 208 respectfully to USB collaboration hub 210. It should be appreciated that moderator computer may be a host computer with additional control functionality in the system. Although only two computers are shown linked to the collaboration hub, it should be appreciated that any number of host computers or other content sources may be linked to the hub. Further the computers may be linked through one or more networks.

Continuing with FIG. 2, USB collaboration hub 210 is operatively linked through USB connection 212 to display device 214. Although shown as a stand-alone device, it should be appreciated that collaboration hub 210 may be integrated within, or configured to be directly coupled to, the display device 214. In such an embodiment, the USB connection 212 may be substantially eliminated. In some embodiments, connection 212 may be a connection other than a USB connection. For example, connection 212 may be a VESA connection to allow coupling of a collaboration hub 210 through an existing installed base of LFDDs 214 with VESA inputs. Therefore, in some embodiments the collaboration hub 210 may have VESA outputs to couple with the installed base of LFDDs 214.

The USB collaboration hub may enable multiple users to link to the display device 214. Additionally, software may be provided for managing multiple users and further extending the functionality of a display device 214. As an example, a user may connect their computer via a USB connection (such as a cable or wirelessly) to the USB collaboration hub. As described above, the hub may be connected to the display device through a second USB connection. In some embodiments, one user may be selected as the moderator. The moderator may be defined by the connection point on the hub (physical determination of moderator) or may be selected by a user through a software program.

Similar to the enumeration described in regards to FIG. 1, the display device 214 may initiate, through the USB collaboration hub, an end-point enumeration as a display device 214. The enumeration may be repeated for each connected host computer. In some embodiments, the enumeration may include a display device descriptor. The display device descriptor may include display device information, including, but not limited to, manufacture information, model information, display mode information (resolution, gamut, color temperature, etc.), and other display device status information. The host computer may receive the display device enumeration (including the display device descriptor) and acknowledge the display device enumeration.

Upon identification of the display device, the host computer may identify whether it has a driver for display device 214. If the driver is not present, the host computer may request the driver from the display device 214. The display device 214 may transmit the content source driver, held resident in the display device 214 (e.g. USB display driver), to the host computer. The host computer may install the transmitted display driver. As an example, the USB driver may be a standard USB driver enumerated for bulk and I-synchronous data transfers.

Following installation of the display driver (or identification of the display driver if driver already present on the host computer), the host computer may establish a bulk end-point for image data and a control end-point for control data. The enumeration and establishment of bulk end-points and control end-points are established for each host computer linked to the USB collaboration hub. As an example, upon completion of the USB enumeration, a display device icon may appear in each host computer's display. For example, if the display device 214 is a projector, a projector icon may automatically appear in the enumerated host computer's Windows Desktop tray.

As described above in regards to FIG. 1, in some embodiments, a user may select a transmission option or mode. For example, the user may select the display device icon and select a transmission mode. For example, a user may select between a Mirror Desktop Monitor mode and an Extended Desktop Monitor mode and a Local Monitor Only mode. If the user does not select one of the transmission options, the system may be preset with a default, such as a default to the Local Monitor Only mode.

In some embodiments, each host computer has a record of each enumerated host computer. Further, the moderator computer may include a record of each enumerated host computer.

The moderator computer may function as the system controller to set collaboration modes and aggregate image content from the host computers. For example, the moderator computer may select one of the following exemplary collaboration modes: Ad-Hoc mode and Moderate Mode. In the Ad-Hoc mode, the USB Channel may be open to any one of the host computers to broadcast image data to the display device 214. In this Mode, if a Host Computer selects Mirror Desktop Monitor mode or Extended Desktop Monitor mode, a token assignment may be transmitted to the collaboration hub to activate the connected port. The token assignment may also be broadcasted to all enumerated host computers for a status indicator of which host computer is currently coupled with the display device 214.

In Moderate Mode, the moderator computer may control which host computer may utilize the USB channel to the display device 214 for Mirror or Extended Desktop Monitor modes. The moderator computer may control the host computer selection via any suitable user interface. For example, a radio-button selection may be provided and coupled with a thumbnail image of the host computer desktop. Upon activation of the desired host computer, a token assignment may be sent to the collaboration hub to activate the desired host computer. The token assignment may also be broadcast to all enumerated host computers for a status indicator of which host computer is coupled with the display device 214.

In some embodiments, in the Moderate Mode, the moderator computer may be enabled to aggregate the image content of multiple host computers connected to the hub. In this exemplary mode, the moderator may select multiple host computers, (the mode may default to mirror the desktop monitors for all selected host computers). In some embodiments, the moderator may default to the extended desktop monitor mode (where the images are rendered). The session may be activated by moderator input, such as through an aggregate radio button. Upon activation, the hub (upon knowledge of multiple token assignments) redirects each of the host computer image data to the moderator. The moderator computer accepts image data and scales the data into appropriate split screen images dependent on the display device capabilities. The aggregated image may then be transferred to the display device 214.

For example in FIG. 2, host computer 204 generates image 220. Host computer and moderator 202 generates image 222. Moderator computer selects to aggregate the images to generate a combined image which is displayed as displayed image 224 by display device 214. Displayed image 224 includes image 220 form host computer 204 and original image 222 from host computer 202. Although the image is shown as a split screen, other suitable formats may be selected by the moderator, e.g. picture-in-picture, side-by-side, etc. Further, the moderator may select to have one of the host computer images sized differently than another image. Further, as discussed above, there may be more than two images aggregated depending on the number of linked computers aggregated by the moderator.

In some embodiments, a Share Files mode may be provided. In the share files mode, each Host computer may have the capability to perform file transfer to any combination of connected host computers. For example, a file to be transferred may be selected and added to a file transfer list. The sending host computer may select to send a File Transfer Request to selected host computers. Each Host Computer may respond with a File Transfer Acknowledge response and upon response, the files in the file transfer list may be transferred. In this mode, the Hub may act as a proxy of the transaction.

Image processing for the example environment of FIG. 2 may be similar to the image procession of FIG. 1. For example, following USB enumeration and selection of the Mirror Desktop Monitor mode, the USB display driver may direct all graphic primitives to a local monitor and its own private image data memory space. The local monitor drawing primitives may behave as normal and remain unchanged. The private image data may compare new image frames with old image frames (Delta Image comparison) identifying image deltas. Image deltas may be encoded into compressed image data. The encoded image deltas may be transmitted to the collaboration hub over a bulk end-point. With a single host computer or from the moderator computer, data may be directed to the display device 214.

In embodiments with multiple host computers, data may be redirected to a moderator computer. Depending on the functionalities of the system, a moderator computer may select to aggregate the data or select a host computer for display. The moderator computer may then transmit the data to the hub which directs the data to the display device 214 for display.

It should be appreciated that with the Extended Desktop Monitor mode, the private image data memory space is updated with image data presented to the extended desktop only. In Aggregate mode, the Mirror Desktop Monitor mode may be the default for the host computers and the Extended Desktop Monitor mode may be the default for the moderator computer.

Figure 3:
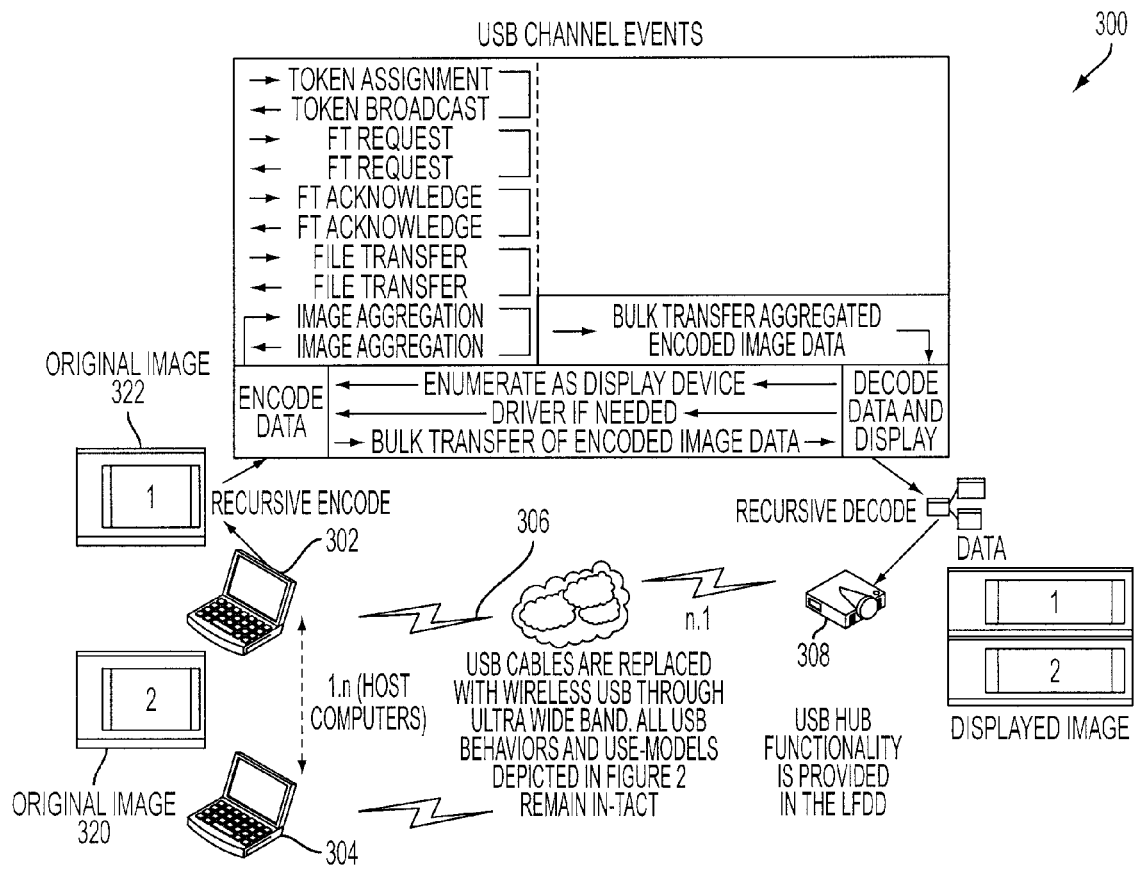
FIG. 3 shows a schematic depiction of an exemplary embodiment of a wireless USB transmission system between a plurality of content sources and a display device according to the present disclosure.

FIG. 3 shows a schematic depiction of an exemplary embodiment of a wireless USB transmission system between a plurality of content sources and a display device 308 according to the present disclosure. In the exemplary environment, host computers 302 and 304 may be operatively coupled to the display device 308 through a wireless USB 306 connection. In some embodiments the USB collaboration hub may provide collaboration between content sources without a display device or without using a display device that is also coupled to the collaboration hub. Further, in some embodiments, a USB collaboration hub may be integrated into display device 308 such that the display device has the functionality and image processing described in regards to FIG. 2. Thus, the host computers and display device (with or without a remote hub) may be wirelessly coupled. Wireless USB may employ ultra wide band radio communication as the wireless link, however other wireless links may also be used without departing from the scope of the disclosure. For example, any suitable high speed wireless connections may be used, as examples, the current IEEE 802.11 a/g/n standards. Further, in some embodiments, some of the host computers may be connected through a wired USB connection and other host computers through a wireless USB connection.

Figure 4:
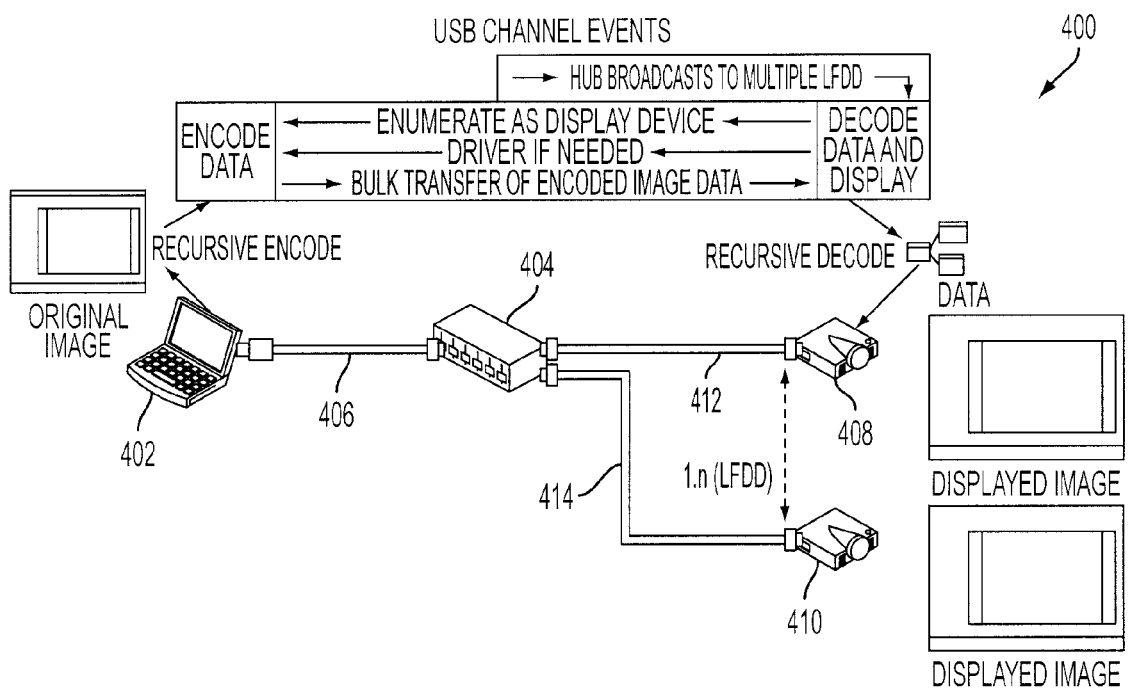
FIG. 4 shows a schematic depiction of another exemplary embodiment of a USB transmission system between a content source and a plurality of display devices utilizing a USB collaboration hub according to the present disclosure.

FIG. 4 shows another embodiment indicated generally at 400. In system 400, a USB transmission system is provided between a content source and a plurality of display devices utilizing a USB collaboration hub. As described above, the USB collaboration hub may be a stand-alone device (as illustrated in FIG. 4) or may be integral to the display device (as illustrated in FIG. 3). Further, although shown as cable connections, the USB connections may be wired connection or wireless connections (as illustrated in FIG. 3).

As illustrated in FIG. 4, a host computer 402 may be operatively coupled to a collaboration hub 404 through a USB connection 406. The collaboration hub may be linked to a plurality of display devices 408 and 410 through USB connections 412 and 414 respectfully. Each display device may be identified on the host computer such that the host computer may select which display device will display the image. Similar image processing steps may be performed for image display as with FIGS. 1 and 2 described above. In some embodiments, a single USB or VESA output from collaboration hub 404 may be split into multiple VESA or USB outputs and the same signal may be sent to multiple display devices 408 and 410.

Figure 5:
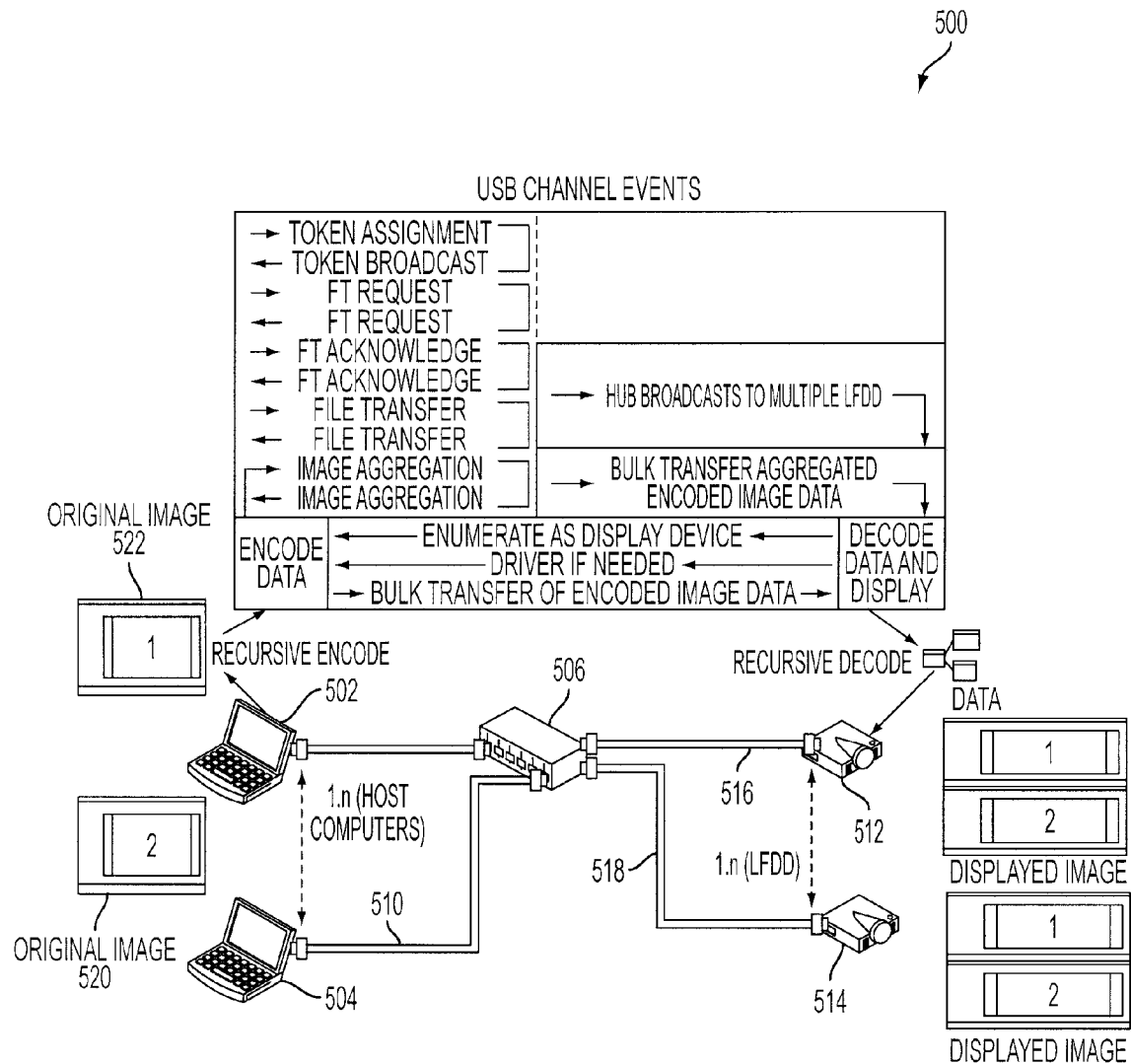
FIG. 5 shows a schematic depiction of another exemplary embodiment of a USB transmission system between a plurality of content sources and a plurality of display devices utilizing a USB collaboration hub according to the present disclosure.

FIG. 5 provides another exemplary embodiment of a USB transmission system 500. In this system a plurality of host computers, e.g. 502 and 504, may be operatively coupled to one or more display devices (e.g. 512 and 514) through a collaboration hub 506. It should be appreciated that the collaboration hub may be a stand-alone device (as illustrated in FIG. 5) or may be integral to the display device (as illustrated in FIG. 3). For remote collaboration hubs, the host computers may be linked to collaboration hub through USB connections (e.g. 508 and 510). Further, the display devices similarly may be linked to collaboration hub 506 through USB connections (e.g. 516 and 518). As discussed above, any one of the USB connections may be a wired USB connection or a wireless USB connection. In some embodiments, a single USB or VESA output from collaboration hub 506 may be split into multiple VESA or USB outputs and the same signal may be sent to multiple display devices 512 and 514.

In operation, system 500, similar to FIG. 2, includes a collaboration hub which may enable the broadcast of image data from multiple host computers to a select display device. Further, similar to FIG. 4, a host computer may select a one or more of a plurality of desired display devices on the system. The moderator may control one or more of the desired display devices.

Figure 6:
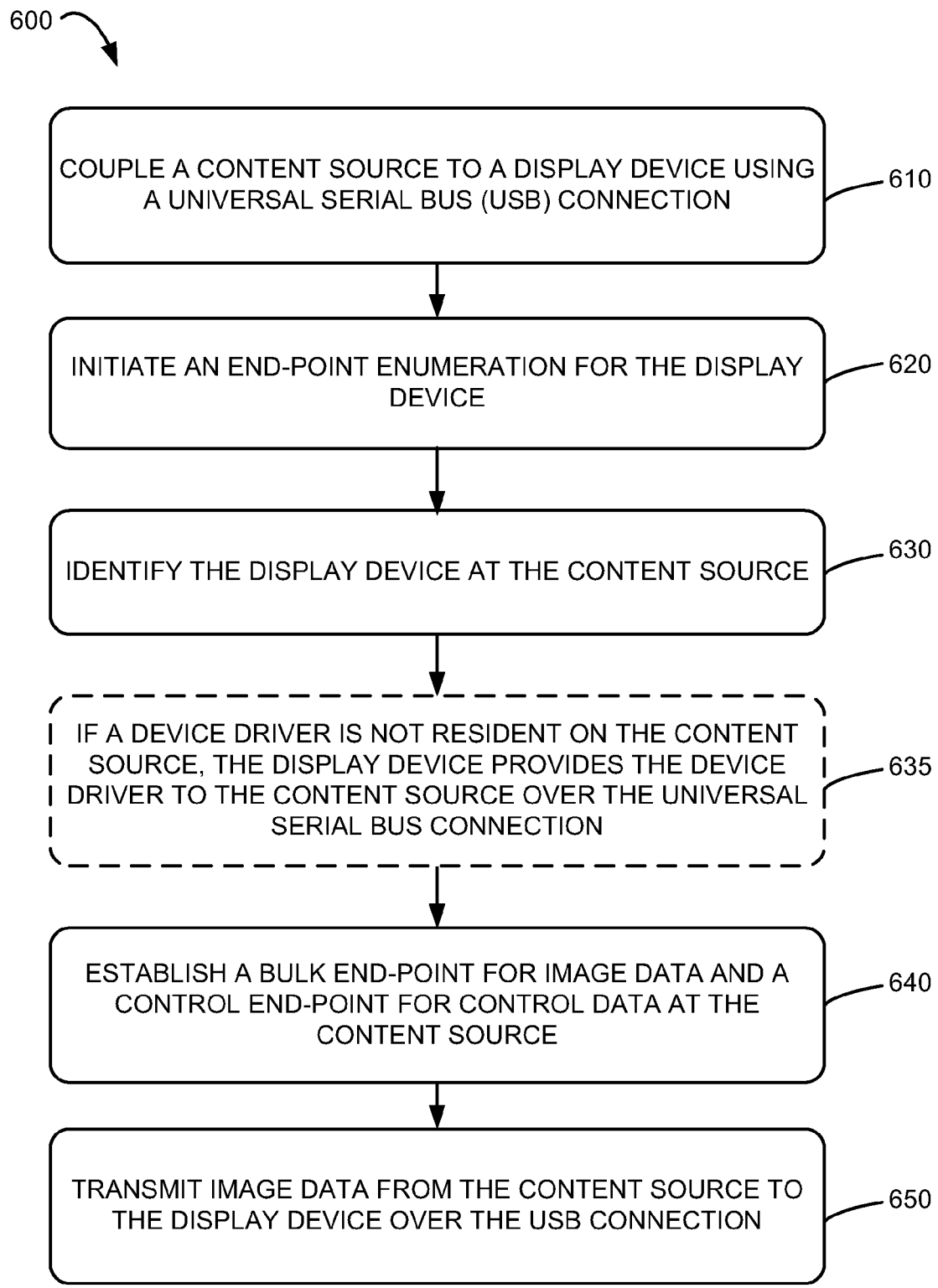
FIG. 6 shows a flow diagram of an exemplary method of a USB image transmission between a content source and a display device according to the present disclosure.

FIG. 6 shows a flow diagram of an embodiment method 600 of a USB image transmission between a content source 12 and a display device 14 according to principles of the present disclosure. In block 610, a content source is coupled with a display device using a universal serial bus (USB) connection. Embodiments may utilize a wired or a wireless USB connection, or even other types of serial connections, for example IEEE 1394, etc.

After the content source is coupled with a display device, method 600 may initiate an end-point enumeration for the display device as illustrated in block 620. Next, the embodiment method 600 may identify the display device at the content source in block 630 and establish a bulk end-point for image data and a control end-point for control data at the content source 12, as shown in block 640. In block 650, the method involves transmitting image data from the content source to the display device over the USB connection. Embodiment methods may also incorporate other functionality explained in the present disclosure, or any equivalents thereof.

The above-described arrangement of display devices, content sources, and collaboration hubs for USB image transmission systems may enable increased uses for display devices in a variety of environments, including conference room settings, education settings, trade shows, entertainment settings, home settings, etc. The USB Image transmission system may overcome cost constraints and other various problems, associated with use of prior image cabling technology such as VESA. The USB image transmission systems provides a simplified system for displaying image data from a standard computing platform for display on a display device, while increasing collaborative use models for display devices.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

What is claimed is:
1. A method comprising:
coupling a content source to a display device using a universal serial bus connection;
initiating an end-point enumeration for the display device;
identifying the display device at the content source;
establishing a bulk end-point for image data and a control end-point for control data at the content source; and
transmitting image data from the content source to the display device over the universal serial bus connection, further comprising sending user selection inputs and data device controls through the control en-point and image data through the bulk-end point.

2. The method of claim 1, further comprising:
identifying if the content source has a driver to operate the display device; and
requesting a driver from the display device if needed, then installing the requested driver for the display device.

3. The method of claim 1, wherein the display device is at least one of a cathode ray tube, a flat panel liquid crystal display, a plasma display, a light emitting diode display, a front projection display and a rear projection display.

4. The method of claim 1, wherein the content source is at least one of a computer, a media server, a storage medium, a camera, a telephone, a personal digital assistant (PDA), and a media player.

5. The method of claim 1, further comprising selecting a transmission mode including at least one of a mirror desktop monitor mode, an extended desktop monitor mode, and a local monitor only mode, and displaying images on the display device according to the transmission mode.

6. The method of claim 1, further comprising coupling at least one of a second content source or a second display device to the universal serial bus connection.

7. An image display system, comprising:
a content source with a universal serial bus port, the content source to provide image data;
a universal serial bus link coupled with the content source;
a display device coupled with the universal serial bus link, the display device to receive the image data from the content source over the universal serial bus link, wherein the display device is configured to undergo an end-point enumeration, and the content source is configured to identify the display device upon connection of the universal serial bus link, wherein the content source is further configured to establish a bulk end-point for image data and a control end-point for control data, and the content source is further configured to send user selection inputs through the control end-point and image data through the bulk-end point.

8. The image display system of claim 7, wherein the universal serial bus link is a wireless universal serial bus link.

9. The image display system of claim 7, wherein the display device is at least one of a cathode ray tube, a flat panel liquid crystal display, a plasma display, a light emitting diode display, a front projection display and a rear projection display.

10. The image display system of claim 7, wherein the content source is at least one of a computer, a media server, a storage medium, a camera, a telephone, a personal digital assistant (PDA), and a media player.

11. The image display system of claim 7, further comprising at least one of a second content source or a second display device coupled with the universal serial bus connection.

12. The image display system of claim 7, wherein the content source is further configured to select a transmission mode including at least one of a mirror desktop monitor mode, an extended desktop monitor mode, and a local monitor only mode, and transmit images to the display device according to the transmission mode.

13. An image display device, comprising:
 a universal serial bus port to receive image data from a content source; and
 circuitry to:
  initiate an end-point enumeration over the universal serial bus port;
  provide identifying information to the content source; and
  receive transmitted data from the content source over the universal serial bus connection, wherein the circuitry is further configured to receive a user selection input and data device controls through a control end-point associated with the content source, and image data through the bulk-end point associated with the content source.

14. The image display device of claim 13, wherein the image display device is at least one of a cathode ray tube, a flat panel liquid crystal display, a plasma display, a light emitting diode display, a front projection display and a rear projection display.

15. The image display device of claim 13, wherein the circuitry is further configured to decode the image data received from the content source if the image data is encoded.

16. The image display device of claim 15, wherein the image data is decoded using at least one of JPEG200, H.264, RDP, MPEG2/4, DivX and QuickTime encoding schemes.

* * * * *